(12) United States Patent
Millet et al.

(10) Patent No.: US 9,402,044 B2
(45) Date of Patent: Jul. 26, 2016

(54) PIXEL PROCESSING CIRCUITRY

(71) Applicant: Commissariat à l'Energie Atomique et aux Energies Alternatives, Paris (FR)

(72) Inventors: Laurent Millet, Saint-Marcel-Bel-Accueil (FR); Arnaud Verdant, Saint-Nazaire-les-Eymes (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 5 days.

(21) Appl. No.: 14/390,745

(22) PCT Filed: Apr. 4, 2013

(86) PCT No.: PCT/EP2013/057147
§ 371 (c)(1),
(2) Date: Oct. 3, 2014

(87) PCT Pub. No.: WO2013/150120
PCT Pub. Date: Oct. 10, 2013

(65) Prior Publication Data
US 2015/0195470 A1    Jul. 9, 2015

(30) Foreign Application Priority Data

Apr. 4, 2012    (FR) ..................................... 12 53107

(51) Int. Cl.
| | |
|---|---|
| *H04N 5/378* | (2011.01) |
| *H04N 5/335* | (2011.01) |
| *H04N 5/347* | (2011.01) |
| *H04N 5/374* | (2011.01) |

(52) U.S. Cl.
CPC ............. *H04N 5/378* (2013.01); *H04N 5/335* (2013.01); *H04N 5/347* (2013.01); *H04N 5/374* (2013.01)

(58) Field of Classification Search
CPC ....... H04N 5/335; H04N 5/347; H04N 5/374; H04N 5/378
See application file for complete search history.

(56) References Cited

U.S. PATENT DOCUMENTS 5,153,731 A * 10/1992 Nagasaki ............... H04N 3/155
                                                        257/231
7,859,583 B2 * 12/2010 Kawaguchi ............ G06F 3/044
                                                        348/294

(Continued)

FOREIGN PATENT DOCUMENTS

| JP | 2009/284553 | 12/2009 |
|---|---|---|
| WO | WO2013/150120 | 10/2013 |

OTHER PUBLICATIONS

International Search Report for PCT/EP2013/057147, European Patent Office, (Jun. 4, 2013).

(Continued)

*Primary Examiner* — Amy Hsu
(74) *Attorney, Agent, or Firm* — Kevin R. Erdman; Brannon Sowers & Cracraft PC (57) ABSTRACT

The invention concerns a method of processing pixel values comprising: during a first read phase, generating a first digital value as a function of pixel values by controlling, based on first and second control signals and a first set of increment rates, the rate that a first counter (220-*i*) is incremented; and during a second read phase, generating a second digital value as a function of pixel values by controlling, based on first and second control signals and a second set of increment rates, the rate that said first counter (220-*i*) is incremented, the first and second sets of increment rates each defining an increment rate for each of a plurality of states of the first and second control signals, wherein said first set of increment rates is different from said second set of increment rates.

20 Claims, 5 Drawing Sheets

(56) References Cited

U.S. PATENT DOCUMENTS

| | | | | |
|---|---|---|---|---|
| 2009/0316015 | A1* | 12/2009 | Iwasa | H04N 5/23232 348/222.1 |
| 2010/0079611 | A1* | 4/2010 | Suzuki | H04N 5/374 348/222.1 |
| 2010/0271521 | A1* | 10/2010 | Kawaguchi | H03M 1/0845 348/302 |
| 2011/0074994 | A1* | 3/2011 | Wakabayashi | H03M 1/0658 348/302 |
| 2012/0008032 | A1* | 1/2012 | Kurihara | H04N 5/3598 348/308 |

OTHER PUBLICATIONS

Cope, "Implementation of 2D Convolution on FPGA, GPU and CPU", Department of Electrical & Electronic Engineering, Imperial College London, (2006).

McLlrath et al., "An Architecture for Low-Power Real Time Image Analysis Using 3D Silicon Technology", Northeastern University, Boston, MA, Proc. SPIE 3362, Helmet- and Head-Mounted Displays III, 184 (Aug. 11, 1998).

Leblebici et al., "Fully Pipelined Programmable Real-Time (3×3) Image Filter Based on Capacitive Threshold-Logic Gates", IEEE International Symposium on Circuits and Systems, (Jun. 9-12, 1997).

* cited by examiner

PIXEL PROCESSING CIRCUITRY

CROSS-REFERENCE TO RELATED APPLICATIONS

The present application is a National Stage of PCT International Application Serial Number PCT/EP2013/057147, filed Apr. 4, 2013, which claims priority under 35 U.S.C. §119 of French Patent Application Serial Number 12/53107, filed Apr. 4, 2012, the disclosures of which are incorporated by reference herein.

BACKGROUND OF THE INVENTION

1. Field of the Invention

The present disclosure relates to circuitry and a method for pixel processing, and in particular to circuitry and a method for performing a function based on a plurality of pixel values read from a pixel array.

2. Description of the Related Art

The processing of pixel values of a captured image generally involves reading the pixel values from a pixel array in an analog form, converting these analog pixel values into digital pixel values, storing the digital pixel values in a memory, and then using an image processor, such as an FPGA (Field Programmable Gate Array), to process the digital values.

A drawback of this type of digital pixel processing is that it is relatively demanding in terms of processing power and resources, and/or it is time consuming.

It has been proposed to perform at least some pixel processing during the digital conversion of the analog pixel values. In particular, the paper entitled "An Architecture for Low-Power Real Time Image an Analysis Using 3D Silicon Technology", Lisa McIlarth and Paul Zavracky, describes a system based on Sigma Delta analog to digital converters (Sigma Delta ADCs).

Figure 1:
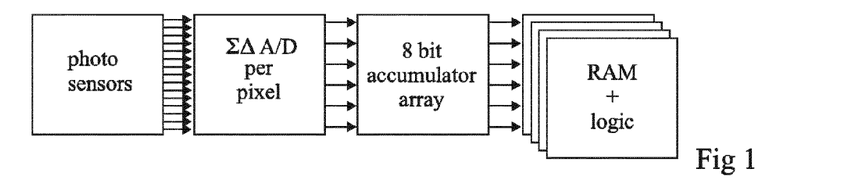
FIG. 1 (describe above) illustrates a known image processing architecture.

FIG. 1 reproduces FIG. 6 of the McIlarth paper. The outputs of an array of photo sensors are provided in parallel to Sigma Delta ADCs, one of which is provided per pixel. The outputs from the Sigma Delta ADCs are then provided to an 8-bit accumulator array, which converts the pulses produced by the Sigma Delta converters into digital values, which are stored in a RAM (Random Access Memory).

A Sigma Delta ADC generates a stream of pulses, the number of pulses being proportional to the sampled analog value. The 8-bit accumulators count the number of pulses in order to generate a digital value proportional to the analog pixel value. McIlarth describes some relatively basic pixel operations that can be performed when converting the Sigma Delta signals into digital values. For example, in order to determine the difference between two pixels, the corresponding Sigma Delta signals are coupled respectively to the positive and negative inputs of an up/down counter.

There are a number of drawbacks with such a solution based on Sigma Delta ADCs. In particular, the need to provide a Sigma Delta converter per pixel makes the architecture relatively consuming in terms of silicon area. Furthermore, while McIlarth suggests that the outputs of several Sigma Delta ADCs could be multiplexed to each accumulator, such an implementation would be rather limited, given that all of the Sigma Delta signals are generated over the same period of time.

Furthermore, in order to perform more that one operation on each pixel value, it would be necessary to couple the output of each Sigma Delta ADC to more than one accumulator. The repeated charging and discharging of these outputs would lead to high energy consumption.

SUMMARY

It is an aim of the embodiments of the present disclosure to at least partially address one or more problems on the prior art.

According to one aspect, there is provided a method of processing pixel values comprising during first and second read phases: asserting, by a ramp converter, a first control signal for a duration based on a pixel value read via a column line of a pixel array; and asserting, by another ramp converter, a second control signal for a duration based on another pixel value read via another column line of said pixel array; during said first read phase, generating a first digital value as a function of at least said pixel values by controlling, by a first counter control circuit based on at least said first and second control signals during said first read phase and on a first set of increment rates, the rate that a first counter is incremented, said first set of increment rates defining an increment rate for each of a plurality of states of the first and second control signals; and during said second read phase, generating a second digital value as a function of at least said pixel values by controlling, by said first counter control circuit based on at least said first and second control signals during said second read phase and on a second set of increment rates, the rate that said first counter is incremented, said second set of increment rates defining an increment rate for each of a plurality of states of the first and second control signals, wherein said first set of increment rates is different from said second set of increment rates.

According to another aspect, there is provided pixel processing circuitry comprising: a ramp converter coupled to a column line of a pixel array and configured to assert, during a first read phase, a first control signal for a duration based on a pixel value read via said column line during said first read phase and configured to assert, during a second read phase, said first control signal for a duration based on a pixel value read via said column line during said second read phase; another ramp converter coupled to another column line of said pixel array and configured to assert, during said first read phase, a second control signal for a duration based on another pixel value read via said another column line during said first read phase and configured to assert, during said second read phase said second control signal for a second duration based on another pixel value read via said another column line during said second read phase; and a first counter control circuit adapted to control a first counter to generate: a first digital value as a function of at least said pixel values read during said first read phase by controlling, based on at least said first and second control signals during said first read phase and on a first set of increment rates, the rate that said first counter is incremented, said first set of increment rates defining an increment rate for each of a plurality of states of the first and second control signals; and a second digital value as a function of at least said pixel values read during said second read phase by controlling, based on at least said first and second control signals during said second read phase and on a second set of increment rates, the rate that said first counter is incremented, said second set of increment rates defining an increment rate for each of a plurality of states of the first and second control signals, wherein said first set of increment rates is different from said second set of increment rates.

According to another aspect, there is provided pixel processing circuitry comprising: a first ramp converter coupled to a first column line of a pixel array and configured to assert a first control signal for a duration based on a first pixel value read via said first column line during a first read phase; a second ramp converter coupled to a second column line of said pixel array and configured to assert a second control signal for a duration based on a second pixel value read via said second column line during said first read phase; and a first counter control circuit adapted to control a first counter to generate a first digital value as a function of at least said first and second pixel values by varying, based on at least said first and second control signals during said first read phase, the rate that said first counter is incremented.

According to one embodiment, the first counter control circuit is adapted to control the first counter to be incremented at a first rate while said first and second control signals are both asserted and at a second rate while only said first control signal is asserted.

According to another embodiment, the first counter control circuit is adapted to control said first counter to be incremented at a further rate while only said second control signal is asserted.

According to another embodiment, the first counter control circuit comprises at least one register storing at least one coefficient, wherein said rates are set by said at least one coefficient.

According to another embodiment, the first counter control circuit comprises at least one input bus on which is provided at least one coefficient, wherein said rates are set by said at least one coefficient.

According to another embodiment, the first and second rates vary during said first read phase.

According to another embodiment, the first ramp converter is further configured to assert the first control signal for a duration based on a first pixel value read via said first column line during a second read phase; said second ramp converter is further configured to assert said second control signal for a duration based on a second pixel value read via said second column line during said second read phase; and said first counter control circuit is adapted to control said first counter to generate said first digital value as a function of at least said first and second pixel values read during said first read phase and said first and second pixel values read during said second read phase, by varying, based said first and second control signals during said first and second read phases, the rate that said first counter is incremented.

According to another embodiment, the first counter control circuit is adapted: to control said first counter during said first read phase to be incremented at a first rate while said first and second control signals are both asserted and at a second rate while only one of said first and second control signals is asserted; and to control said first counter during said second read phase to be incremented at a third rate while said first and second control signals are both asserted and at a fourth rate while only one of said first and second control signals is asserted.

According to another embodiment, the pixel processing circuitry further comprises: a third ramp converter coupled to a third column line of said pixel array and configured to assert a third control signal for a duration based on a third pixel value read via said third column line during said first read phase; wherein said first counter control circuit is adapted to control said first counter to generate said first digital value as a function of at least said first, second and third pixel values by varying, based on at least said first, second and third control signals during said first read phase, the rate that said first counter is incremented.

According to anther embodiment, the pixel processing circuitry further comprises: a second counter control circuit adapted to control a second counter to generate a second digital value as a function of at least said second and third pixel values by varying, based on at least said second and third control signals during said first read phase, the rate that said second counter is incremented.

According to another embodiment, the first counter control circuit is further adapted to control a third counter to generate a third digital value as a function of at least said first and second pixel values by varying, based on at least said first and second control signals during said first read phase, the rate that a third counter is incremented.

According to another embodiment, the first counter control circuit is adapted to vary the rate that said first counter is incremented by performing one of: generating increment values and supplying them to said first counter; and adjusting the frequency of a clock signal controlling said first counter.

According to another embodiment, the pixel processing circuitry further comprises logic circuitry adapted to determine which of the first and second control signals is asserted for the longest duration by determining at least one of: whether either of said first and second control signals is the only control signal to be asserted; whether either of said first and second control signals is the only control signal not to be asserted.

According to a further aspect, there is provided an imaging device comprising the above pixel processing circuitry, the imaging device having: a first integrated circuit comprising said pixel array and said first and second ramp converters; and a second integrated circuit stacked with respect to said first integrated circuit and comprising said first counter control circuit, wherein said first and second control signals are transmitted from said first integrated circuit to said second integrated circuit via one or more interconnections.

According to a further aspect, there is provided a method of processing pixel values comprising: during a first read phase: asserting, by a first ramp converter, a first control signal for a duration based on a first pixel value read via a first column line of a pixel array; asserting, by a second ramp converter, a second control signal for a duration based on a second pixel value read via a second column line of said pixel array; and generating a digital value as a function of at least said first and second pixel values by varying, by a first counter control circuit based on at least said first and second control signals, the rate that a first counter is incremented.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which.

Through-out the drawings, like features have been designated with like reference numerals.

DETAILED DESCRIPTION

Figure 2A:
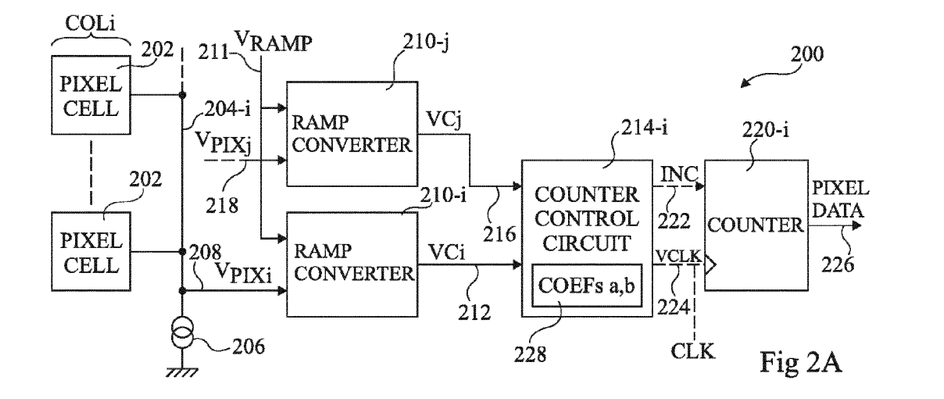
FIG. 2A schematically illustrates pixel processing circuitry according to an example embodiment.

FIG. 2A illustrates circuitry 200 for processing pixel data according to an example embodiment.

Pixel cells 202, of which two are shown in FIG. 2A, form an ith column COLi of a pixel array (not illustrated in FIG. 2A). Each pixel cell 202 of column COLi has an output coupled to a corresponding column line 204-$i$ of the pixel array. The column line 204-$i$ is for example coupled to ground via a current source 206, and is also coupled by a connection 208 to a ramp converter 210-$i$ associated with column i. The ramp converter 210-$i$ also receives a ramp signal $V_{RAMP}$ on a line 211.

An output signal VCi of the ramp converter 210-$i$ is provided on an output line 212, which is coupled to an input of a counter control circuit 214-$i$ associated with column i. The counter control circuit 214-$i$ also has a further input coupled by a line 216 for receiving a further control signal VCj at the output of a further ramp converter 210-$j$ associated with a jth column (not illustrated) of the pixel array. Ramp converter 210-$j$ also receives the ramp signal $V_{RAMP}$ via line 211, and also comprises a further input coupled via a line 218 to a column line 204-$j$ (also not shown in FIG. 2) of the jth column.

The counter control circuit 214-$i$ for example comprises a memory 228 storing a set of coefficients a and b, as will be described in more detail below.

An output of the counter control block 214-$i$ is coupled to a counter 220-$i$ associated with column i. In particular, the counter control circuitry 214-$i$ provides a variable increment value INC on a line 222 to a data input of the counter 220-$i$ and/or the counter control circuitry 214-$i$ provides a variable clock signal VCLK on a line 224 to a clock input of the counter 220-$i$. In some embodiments, only the variable increment value INC is provided, and the clock input line 224 receives a standard clock signal CLK. Alternatively, only the variable clock signal VCLK is provided by the counter control block, and no variable increment value is provided, a unitary increment being performed by the counter on each clock. Alternatively, both a variable increment value and a variable clock signal could be provided. In any case, the variable increment value INC and/or variable clock signal VCLK control the rate that the counter 220-$i$ increments in time, as will be describe in more detail below.

An output 226 of the counter 220-$i$ provides pixel data. As will be explained in more detail below, this pixel data provides the result of a function applied to at least one pixel value read from each of the ith and jth columns of the pixel array.

The pixel array of FIG. 2A for example comprises hundreds or even thousands of columns, and while not represented in FIG. 2, each of these columns is for example associated with a ramp converter 210, counter control circuit 214, and counter 220. The ith and jth columns could be any of the columns of the pixel array, which are for example adjacent columns. For example, the pixel array forms part of the camera module of an image capturing device and/or video capturing device, such as a digital still or video camera, mobile telephone such as a smart phone with built-in camera, webcam of a PC, laptop or tablet computer, or other such device.

In operation, the pixel array is for example read row by row. However, in alternative embodiments, the rows of the pixel array are not read consecutively, but may instead be read in any order. The term "read phase" is generally used herein to designate the read operation for reading the pixels of a row of the pixel array at the same time. However, this term equally designates reading operations of fewer pixels than an entire row of a pixel, and reading operations of more than one row of the pixel array at the same time, which may be possible in some embodiments. Such read phases may or may not be consecutive.

For example, the pixel array operates in a rolling shutter mode, whereby the integration period of each line of pixels is staggered in time. In this way, shortly after the end of the integration period of each line of pixels, the corresponding pixel values are read.

Alternatively, the pixel cells of the pixel array could be adapted to capture a snapshot picture, in other words to apply a global shutter. In such a case, each pixel cell for example comprises a storage device, such as a capacitor, for storing the pixel value until its line is read.

During each read phase, a pixel value is for example read via each of the column lines 204-$i$, 204-$j$, and converted by the corresponding ramp converters 210-$i$, 210-$j$ into control signals asserted for a duration based on the levels of the pixel values. In particular, the ramp converters 210-$i$, 210-$j$ respectively generate control signals VCi, VCj, each of which is asserted for a duration based on the corresponding pixel value.

The counter control circuit 214-$i$ is adapted to receive these control signals VCi and VCj, and to vary the rate that the counter 220-$i$ is incremented as a function of these control signals. Depending on how this control is performed, a variety of functions may be performed on the pixel values.

For example, in one embodiment, the counter control circuit 214-$i$ is adapted to simply perform an addition of the two pixel values, as represented in table I below. Table I shows in a third column an example increment value INC that could be generated for each of the four possible states of the signals VCi, VCj shown in the first and second columns of table I. In particular, the counter 220-$i$ is incremented by one when only one of the control signals VCi, VCj is asserted, and by two when both of the control signals VCi, VCj is asserted. Table I also shows in a fourth column, representing, as an alternative, the frequency of the clock signal VCLK that could be supplied to the counter by the counter control circuit 214-$i$ based on the control signals VCi, VCj. The frequency f is for example a fraction of the normal clocking frequency of the device.

TABLE I

| VCi | VCj | INC VALUE | VCLK FREQ |
|-----|-----|-----------|-----------|
| 0   | 0   | 0         | 0         |
| 1   | 0   | 1         | F         |
| 0   | 1   | 1         | F         |
| 1   | 1   | 2         | 2f        |

As an alternative example, a sum of weighted pixel values could be achieved by using the increment values or clock frequency values indicated in table II below, wherein a and b are coefficients used to weight the pixel values. For example, the coefficients a and b are stored in the memory 228 of the counter control circuit 214-i described above. Each of the coefficients a and b can be positive or negative.

TABLE II

| VCi | VCj | INC VALUE | VCLK FREQ |
|-----|-----|-----------|-----------|
| 0   | 0   | 0         | 0         |
| 1   | 0   | A         | af        |
| 0   | 1   | B         | bf        |
| 1   | 1   | a + b     | (a + b)f  |

As yet a further example, a subtraction of one pixel value from another could be performed by using the increment values of Table III below, where coefficient a is for example equal to 1, or to another value to apply a weighting. A subtraction could also be formed based on a variation of the clock signal VCLK. For example, the counter includes a control input indicating whether it is to count up, or count down, controlled based on the sign of the increment value. At the same time, the frequency of clock VCLK is equal to af, and thus determined by the weight a.

TABLE III

| VCi | VCj | INC VALUE |
|-----|-----|-----------|
| 0   | 0   | 0         |
| 1   | 0   | a         |
| 0   | 1   | −a        |
| 1   | 1   | 0         |

In some embodiments, the weightings, in other words the coefficients, vary during the time that the signals VCi, VCj are asserted, thereby allowing other functions such as a log or exponential function to be applied to the pixel values. Furthermore, as indicated above, any of the coefficients may be positive or negative.

The operation of the pixel processing circuitry 200 of FIG. 2A will now be described in more detail with reference to FIGS. 2B, 2C and 3.

Figure 2B:
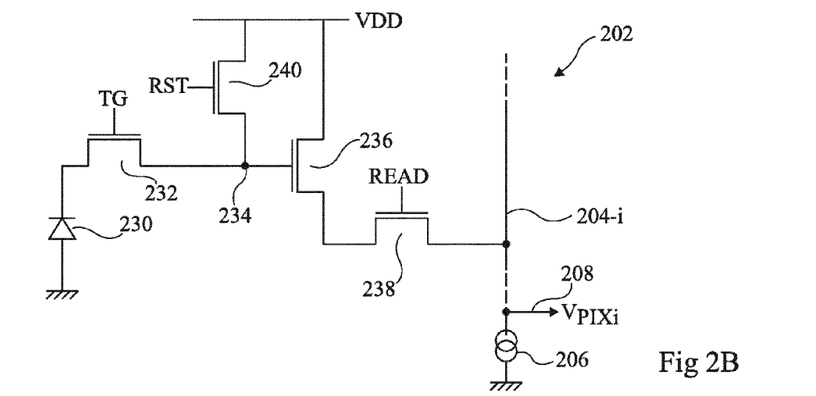
FIG. 2B schematically illustrates a pixel cell of the circuitry of FIG. 2A in more detail according to an example embodiment.

FIG. 2B illustrates an example of a circuit forming the pixel cells 202. A photodiode 230 is coupled by a MOS transistor 232 to a sense node 234. Transistor 232 is controlled at its gate node by a transfer gate signal TG. The sense node 234 is coupled to the gate node of a MOS transistor 236, the drain of which is coupled to a supply voltage VDD, and the source of which is coupled to the column line 204-i via a read transistor 238 controlled at its gate node by a read signal READ. A reset transistor 240 is coupled between the sense node 234 and supply voltage VDD, and is controlled at its gate node by a reset signal RST.

The pixel circuit of FIG. 2B is a 4T pixel circuit, and its operation is well known to those skilled in the art, and will not be discussed in detail. In short, at the end of an integration phase of a pixel array, the transfer transistor 232 is used to transfer negative charge accumulated by a photodiode to the sense node 234. Then, during a subsequent or simultaneous read operation, performed row by row in the pixel array, under control of the signals READ and RST, the voltage at the sense node 234 is output on the column line 204-i, via the sense transistor 236 and the read transistor 238.

Other types of pixel circuits could be used, such as 3T or 2.5T circuits, which operate in a similar fashion to a 4T circuit, as is known to those skilled in the art. Furthermore, as indicated above, pixel circuits adapted to operate in a global shutter mode could also be used, such pixel cells for example having a storage device for storing the pixel value until it is read.

Figure 2C:
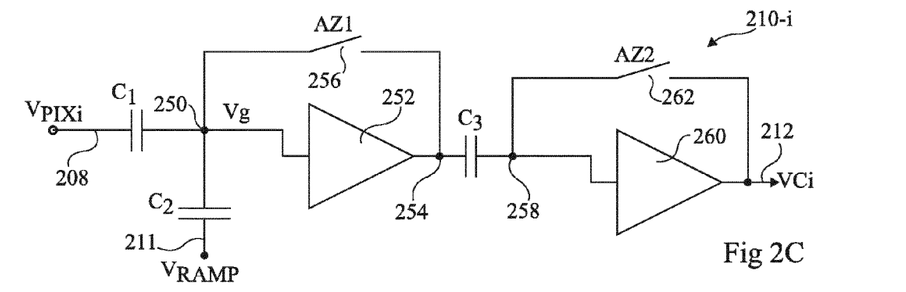
FIG. 2C schematically illustrates a ramp converter of the circuitry of FIG. 2A in more detail according to an example embodiment.

FIG. 2C illustrates an example of the ramp converter 210-i. The ramp converter 210-j is for example implemented by the same circuit. Such a circuit is for example described in more detail in the publication entitled "Continuous Time Column Parallel Readout for CMOS Image Sensor", G. G. Storm et al., 2007 International image sensor workshop, Jun. 6-10, 2007, which is hereby incorporated by reference to the extent permitted by the law.

As illustrated in FIG. 2C, the input line 208 receives a pixel value $V_{PIXi}$ read from a selected pixel cell of the column COLi, and is coupled via a capacitor $C_1$ to an input terminal 250 of an amplifier 252. Node 250 is also coupled by capacitor $C_2$ to line 211 receiving the ramp signal $V_{RAMP}$. The output node 254 of the amplifier 252 is coupled via a feedback path comprising a switch 256 to the input node 250.

The output node 254 of amplifier 252 is further coupled via a capacitor $C_3$ to an input node 258 of a further amplifier 260. The output node of amplifier 260 is coupled to line 212 and provides the control signal VCi of FIG. 2A. This output node is also coupled via a feedback path comprising a switch 262 to the input node 258.

The switches 256 and 262 are controlled by signals AZ1 and AZ2 respectively.

Operation of the circuits of FIGS. 2B and 2C will now described with reference to the timing diagram of FIG. 3.

Figure 3:
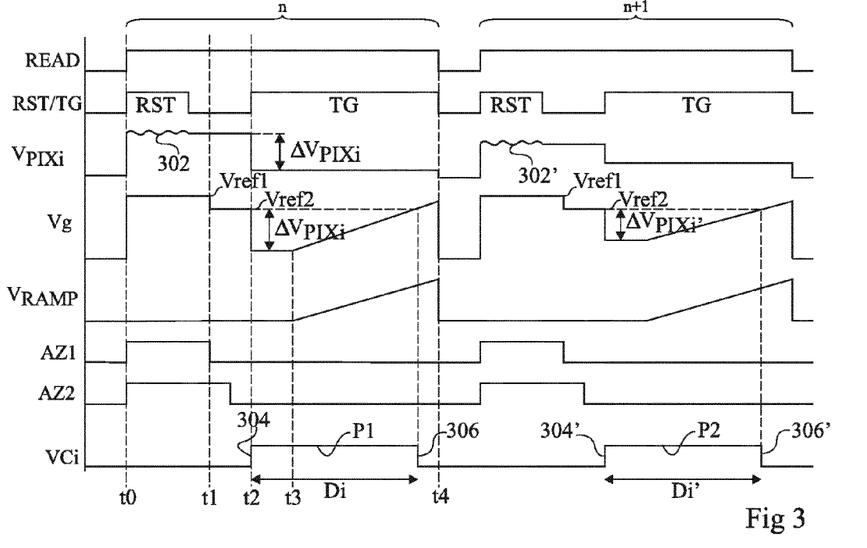
FIG. 3 is a timing diagram representing signals in the circuits of FIGS. 2B and 2C according to an example embodiment.

FIG. 3 is a timing diagram illustrating examples of: the read signal READ, reset signal RST and transfer gate signal TG of the pixel cell 202 of FIG. 2A; and the signal $V_{PIXi}$, a signal Vg at the input of amplifier 252, the signal VCi, the switch signals AZ1, AZ2 and the ramp signal $V_{RAMP}$ of the ramp converter of FIG. 2C.

Initially, the signals READ, RST, AZ1 and AZ2 are all for example asserted at a time t0 at the start of a read phase n, although in alternative embodiments the assertion of these signals could be offset with respect to each other, in any activation order. Thus the value at the sense node of a selected pixel cell is output on line 208 to provide a first value of the signal $V_{PIXi}$. In particular, the signal $V_{PIXi}$ for example goes to a level 302 corresponding to the reset voltage and noise. While the signals AZ1 and AZ2 are high, the amplifiers 252 and 260 become balanced and cause the voltage Vg at node 250 to rise to a level Vref1. A falling edge of the reset signal then stops the noise on the signal $V_{PIXi}$, but the reset level is maintained.

At a time t1, a falling edge of signal AZ1 opens switch 256, creating charge injection to Vg such that the voltage Vg at node 250 falls to a level labelled Vref2 in FIG. 3.

Then, a falling edge of signal AZ2 causes the switch 262 to be opened, such that capacitor $C_3$ stores the output 254 of amplifier 252.

Next, at a time t2 the signal TG is asserted, causing the voltage Vg to fall to a level Vref2−$\Delta V_{PIXi}$. This voltage drop $\Delta V_{PIXi}$ corresponds to what is referred to herein as the "pixel value" of the pixel cell, and represents the captured signal. The rising edge of the signal TG at time t2 also causes a rising edge 304 of the signal VCi at the output of amplifier 260. Shortly afterwards, at a time t3, the ramp signal $V_{RAMP}$ starts to rise, for example in a linear fashion, although other forms of the ramp signal would be possible, such as a quadratic or exponential form. This causes a corresponding rise in the voltage Vg. When the voltage Vg reaches the level Vref2, the output of amplifier 260 falls low, as represented by falling edge 306 of signal VCi in FIG. 3. Thus the signal VCi has a pulse P1 of duration Di that depends on the level of the pixel value that has been read.

At the end of the read phase n at a time t4, the signals READ and TG are for example brought low, and the signals $V_{PIXi}$, Vg and $V_{RAMP}$ for example fall low.

It should be noted that in the example of FIG. 3 the start of the pulse P1 is not synchronized with the start of the ramp $V_{RAMP}$, and thus the pulse duration Di has an additional constant time offset equal to t3−t2. In alternative embodiments the start of pulse P1 could be synchronized with the start of the ramp signal $V_{RAMP}$.

Subsequent signals in FIG. 3 represent a subsequent read phase n+1, in which the row n+1 of the pixel array is for example read. The signals are the same as in the read phase n, and have been labelled with like reference numerals with the addition of an apostrophe, and will not be described again in detail. In the read phase n+1, the signal VCi has a pulse P2 of during Di', based on the new pixel value that is read.

Figure 4:
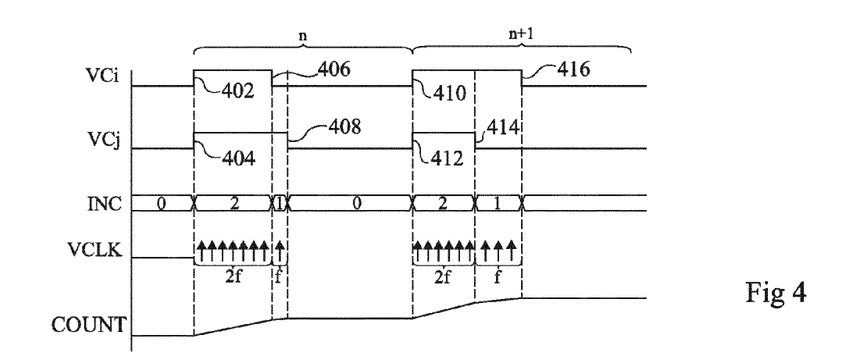
FIG. 4 is a timing diagram representing signals in the circuit of FIG. 2A according to an example embodiment.

FIG. 4 illustrates examples of the signal VCi from ramp converter 210-i and signal VCj from ramp converter 210-j of FIG. 2A during consecutive read phases n and n+1, examples of the signals INC and VCLK generated by the counter control circuit 214-i, and an example of a count value COUNT stored inside the counter 220-i.

In the first read phase n, the signals VCi and VCj each for example have rising edges 402 and 404 respectively falling at substantially the same time. In the example of FIG. 4, the counter control circuit 214-i is adapted to perform a simple addition of the pixel values corresponding to the signals VCi and VCj over the two read phases n and n+1.

In one example, the counter control circuit 214-i generates the increment signal INC based on the signals VCi and VCj. When the signals VCi and VCj are both low, the signal INC is equal to zero, and thus the COUNT value is not incremented. When both the signals VCi and VCj are high, the increment signal INC is equal to 2. When only one of the signals VCi and VCj is high, the increment signal INC is equal to 1. Thus, during the read phase n in FIG. 3, the increment signal is equal to 2 between the time of the rising edges 402, 404 and the time of a falling edge 406 of signal VCi, and equal to 1 between the time of the falling edge 406 of signal VCi and the time of a falling edge 408 of signal VCj. During the subsequent read phase n+1, the increment signal INC is equal to 2 between the time of rising edges 410, 412 of the signals VCi, VCj and the time of a falling edge 414 of signal VCj, and equal to 1 between the time of falling edge 414 of signal VCj and the time of a falling edge 416 of signal VCi.

In an alternative example, the counter control circuit 214-i generates the clock signal VCLK based on the signal VCi and VCj. When the signals VCi and VCj are both low, the signal VCLK has no clocking edges, and thus the COUNT value is not incremented. When both the signals VCi and VCj are high, the clock signal VCLK has a relatively high frequency of 2f. When only one of the signals VCi and VCj is high, the clock signal VCLK has a lower frequency of f. Thus, during the read phase n in FIG. 3, the clock signal is at frequency 2f between the time of the rising edges 402, 404 and the time of a falling edge 406 of signal VCi, and equal to f between the time of the falling edge 406 of signal VCi and the time of a falling edge 408 of signal VCj. During the subsequent read phase n+1, the clock signal INC is at frequency 2f between the time of rising edges 410, 412 of the signals VCi, VCj and the time of a falling edge 414 of signal VCj, and equal to f between the time of falling edge 414 and the time of a falling edge 416 of signal VCi.

Whichever of the control techniques based on signal INC or signal VCLK is used, the count signal COUNT will rise at a first rate for the periods in which both of the signals VCi and VCj are high, and at a second lower rate while only one of the signals VCi and VCj is high. If the counter 220-i is not reset between the read phases n and n+1, the count is accumulated, as shown in FIG. 4. Alternatively, the count value could be reset, depending on the function that is to be applied.

A further example of a function applied to pixel values will now be described with reference to FIGS. 5A, 5B, 6A, 6B, 7 and 8.

Figure 5A:
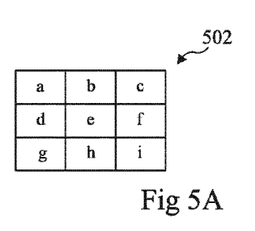
FIG. 5A represents a convolution kernel according to an example embodiment.

FIG. 5A illustrates an example of a kernel 502 that defines a function to be applied to neighbouring pixels in an image. In the example of FIG. 5A, the kernel is a convolution kernel applied to the pixels of a three by three sub-block of pixels. The kernel defines nine coefficients a to i. In particular, in the example of FIG. 5A, the coefficients a, b and c are applied to the left, middle and right columns of a top row of pixels, the coefficients d, e and f are applied to the left, middle and right columns of a middle row of pixels, and the coefficients g, h and i are applied to the left, middle and right columns of a bottom row of pixels. Each of the coefficients a to i could be positive or negative. A kernel having all positive coefficients allows for example a weighted average of the corresponding pixel values to be calculated. The use of both positive and negative coefficients for example allows contour extraction or detection.

Figure 5B:
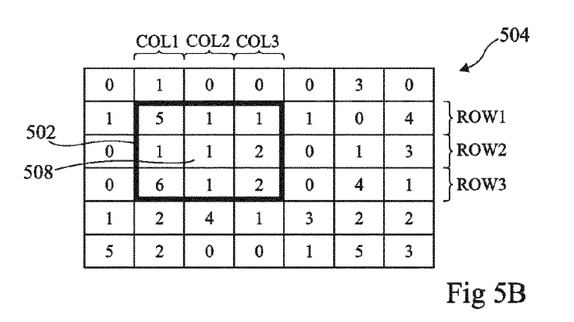
FIG. 5B shows the application of the convolution kernel of FIG. 5A to a portion of an image according to an example embodiment.

FIG. 5B illustrates an example of a portion 504 of a captured image of the pixel array, which is seven columns wide and six columns high. An example of pixel values read from each cell are provided, represented as integer numerical values between 0 and 6, although of course in reality the pixel values are analog voltage levels that could have any of a relatively broad range of levels.

As illustrated in FIG. 5B, it is assumed that the kernel is positioned over a block of pixels corresponding to adjacent columns COL1, COL2 and COL3, and adjacent rows ROW1, ROW2 and ROW3 of the image portion 504. In this example, the pixel values in this block corresponding to the positions the coefficients a to i of the kernel 502 are equal to 5, 1, 1, 1, 1, 2, 6, 1, 2. When the kernel is applied, the result is for example associated with the central pixel in the sub-block. Thus, in the example of FIG. 5B, the pixel of column COL2, row ROW2 for example becomes equal to:

$$Pix_{2,2} = 5a+b+c+d+e+2f+6g+h+2i$$

In one example, the coefficients a, c, g and i are equal to 0, the coefficients b, d, f and h are equal to 1, and the coefficient e is equal to 5. Thus, in such an example, the pixel $Pix_{2,2}$ is for example equal to 10. In alternative examples, there are many other types of kernels that could be applied, for example a kernel as above but with the coefficients b, d, f and h equal to −1 rather than 1, or a kernel having all of the coefficients a to i equal to 1 to perform a simple addition of the nine pixel values.

When applied to a whole image, the kernel 502 is applied to all pixels such that each pixel is assigned a value based on its surrounding pixels. For the pixels at the edge of the image, for which pixel values for all of the three by three inputs of the kernel will not be available, default inputs are for example used for the missing values, or in some cases no modified pixel values are provided for these pixels, the resulting image therefore being slightly smaller than the initial image.

Figure 6A:
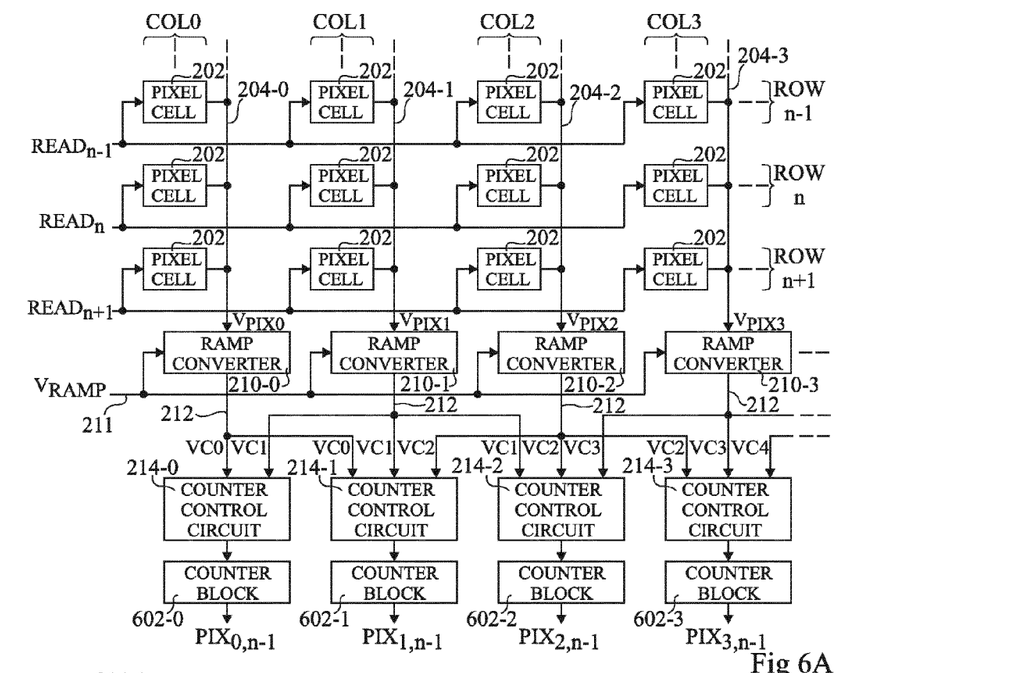
FIG. 6A schematically illustrates pixel processing circuitry according to yet a further example embodiment.

FIG. 6A illustrates a portion of a pixel array, along with pixel data processing circuitry, for applying the three by three convolution kernel 502 of FIG. 5A. Four columns COL0 to COL3 of pixel cells 202 are illustrated, which are for example the left-hand three columns of a pixel array. Three rows n−1, n and n+1 of pixel cells are also illustrated, which for example correspond to the bottom three rows of the pixel array.

The column lines 204-0, 204-1, 204-2 and 204-3 corresponding respectively to the columns COL1 to COL3, are each coupled to corresponding ramp converters 210-0, 210-1, 210-2 and 210-3. These ramp converters 210-0 to 210-3 provide control signals VC0, VC1, VC2 and VC3 respectively. Each of the columns COL0 to COL3 has associated with it a respective counter control circuit 214-0, 214-1, 214-2 and 214-3. In this example, each signal VCi is provided to the counter control circuit of the corresponding column and to the counter control circuits of the adjacent columns on each side. In particular, the signal VC0 is provided to the counter control circuits 214-0 and 214-1, the signal VC1 is provided to the counter control circuits 214-0, 214-1 and 214-2, the signal VC2 is provided to the counter control circuits 214-1, 214-2 and 214-3, etc. Each counter control circuit 214-0 to 214-3 controls a corresponding counter block 602-0 to 602-3, each of which outputs a pixel value resulting from the convolution, in particular the values $PIX_{0,n-1}$ to $PIX_{3,n-1}$, corresponding to columns COL0 to COL3 and row n−1.

Figure 6B:
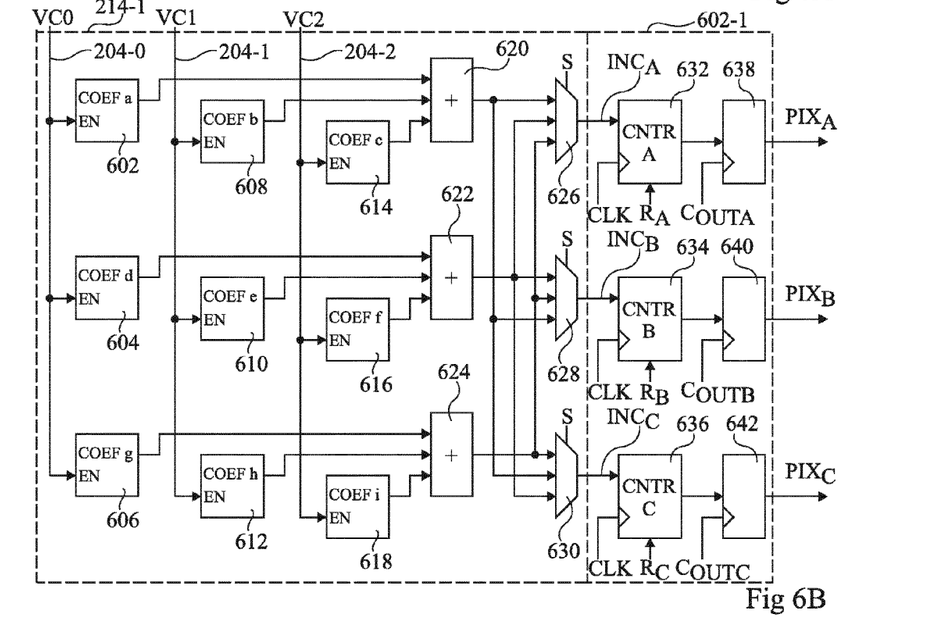
FIG. 6B illustrates a counter control circuit and a counter block of FIG. 6A in more detail according to an example embodiment.

FIG. 6B illustrate the counter control circuit 214-1 and counter block 602-1 of FIG. 6A in more detail according to one example. The other counter control circuits and counter blocks of FIG. 6A for example have the same structure.

As illustrated, the signal VC0 from ramp converter 210-0 on line 204-0 is coupled to an enable input of each of three registers 602, 604 and 606, which store respectively the coefficients a, d and g of the kernel of FIG. 5A. Similarly, the signal VC1 from ramp converter 210-1 on line 204-1 is coupled to an enable input of each of three registers 608, 610 and 612, which store respectively the coefficients b, e and h of the kernel of FIG. 5A. Similarly, the signal VC2 from ramp converter 210-2 on line 204-2 is coupled to an enable input of each of three registers 614, 616 and 618, which store respectively the coefficients c, f and i of the kernel of FIG. 5A.

The outputs of registers 602, 608 and 614 are coupled to corresponding inputs of a three-value adder 620, the outputs of registers 604, 610 and 616 are coupled to corresponding inputs of a three-value adder 622, and the outputs of registers 606, 612 and 618 are coupled to corresponding inputs of a three-value adder 624. The outputs of adders 620, 622 and 624 are each provided to corresponding inputs of three multiplexers 626, 628 and 630.

The outputs of multiplexers 626, 628 and 630 are respectively coupled to an input of respective counters 632, 634 and 636 of the counter block 602-1, and provide increment values $INC_A$, $INC_B$ and $INC_C$ respectively. Each of the counters 632 to 636 is controlled by a clock signal CLK, and also for example receives a corresponding reset signal $R_A$, $R_B$ and $R_C$ respectively.

The output of counter 632 is for example coupled to a flip-flop 638 controlled by a clock signal $C_{OUTA}$. Similarly, the output of counter 634 is for example coupled to a flip-flop 640 controlled by a clock signal $C_{OUTB}$, and the output of counter 636 is for example coupled to a flip-flop 642 controlled by a clock signal $C_{OUTC}$. The flip-flops 638, 640 and 642 for example store the counter results and supply the pixel value at the appropriate time. In alternative embodiments, these flip-flops could be omitted.

In the case of the counter control circuit 214-0, which only receives the two signals VC0 and VC1, the registers 602, 604 and 606 are for example omitted, and a default value is for example added to the count value reached by each counter 632, 634 and 636. In alternative embodiments, the counter control circuit 214-0 and counter block 602-0 could be omitted.

Operations of the circuitry of FIGS. 6A and 6B will now be described with reference to the timing diagram of FIG. 7.

Figure 7:
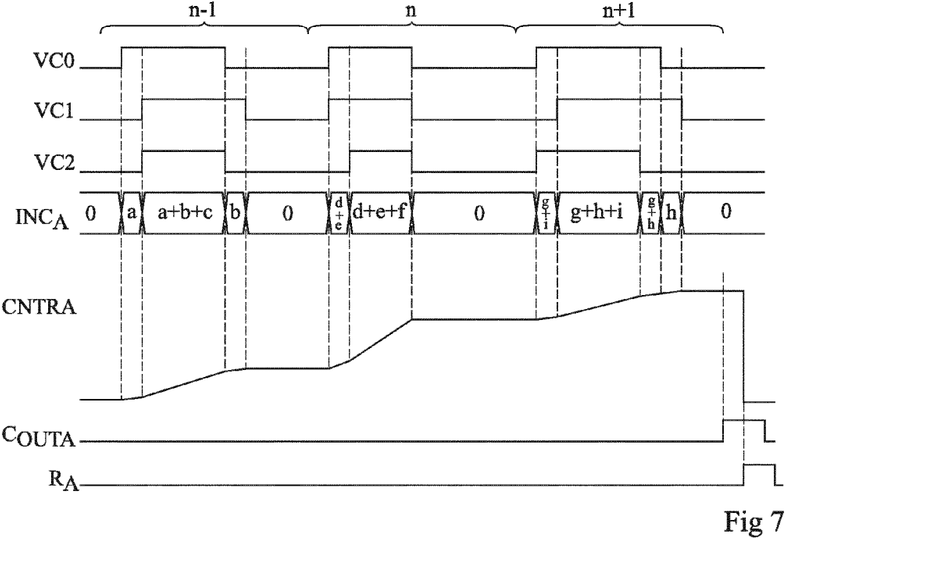
FIG. 7 is a timing diagram representing signals in the circuitry of FIGS. 6A and 6B according to an example embodiment.

FIG. 7 illustrates examples of the control signals VC0, VC1 and VC2, the increment signal $INC_A$, the count value CNTRA of counter 632, the clock signal $C_{OUTA}$, and the reset signal $R_A$.

Three subsequent read phases n−1, n and n+1 are illustrated, during which the rows n−1, n, n+1 of the pixel array are read.

In the example of FIG. 7, the control signals VC0, VC1 and VC2 do not have rising or falling edges synchronized with each other, which does not affect operation of the circuit.

During the read cycle n−1, while the signal VC0 is asserted, the increment value $INC_A$ includes coefficient a, while the signal VC1 is asserted, the increment value $INC_A$ includes coefficient b and while the signal VC2 is asserted, the increment value $INC_A$ includes the coefficient c. This is achieved by using the signals VC0 to VC2 to enable the corresponding registers 602, 608 and 614 of FIG. 6B, using the adder 620 to sum the coefficients, and the multiplexer 626 to pass the output of adder 620 to counter 632. In the example of FIG. 7, initially only signal VC0 is asserted, and signal $INC_A$ is equal to only coefficient a. Then, all three signals VC0 to VC2 are asserted, and signal $INC_A$ is equal to a+b+c. Then, only the signal VC1 is asserted, and thus the signal $INC_A$ is equal to just b.

During the subsequent read cycle n, the multiplexer 626 couples the output of adder 622 to the counter 632, and thus the signal $INC_A$ is based on registers 604, 610 and 616 respectively storing the coefficients d, e and f. Thus, while the signal VC0 is asserted, the increment value $INC_A$ includes coefficient d, while the signal VC1 is asserted, the increment value $INC_A$ includes coefficient e and while the signal VC2 is asserted, the increment value $INC_A$ includes the coefficient f.

During the subsequent read cycle n+1, the multiplexer 626 couples the output of adder 624 to the counter 632, and thus the signal $INC_A$ is based on registers 606, 612 and 618 respectively storing the coefficients g, h and i. Thus, while the signal VC0 is asserted, the increment value $INC_A$ includes coefficient g, while the signal VC1 is asserted, the increment value $INC_A$ includes coefficient h and while the signal VC2 is asserted, the increment value $INC_A$ includes the coefficient i.

The signal CNTRA represents the count value stored by the counter 632 during the three read phases n−1, n and n+1. As illustrated, the rate that the count value increases varies based on which of the signals VC0, VC1 and VC2 is active, and also based on assumed values of the coefficients a to i.

The signal $C_{OUTA}$ goes high at the end of the read phase n+1, and thus causes to be output of the accumulated value that counter 632 has reached. Furthermore, the reset signal $R_A$ for example goes high a short time afterwards, thereby resetting the count value of counter 632 to zero.

The operations represented during the read cycles n−1, n and n+1 in FIG. 7 in relation to the signal $INC_A$ for example repeat every three read cycles until all of the rows of the pixel array have been read.

The other signals $INC_B$ and $INC_C$ in FIG. 6B that control counters 634 and 636 are generated in a similar fashion to the signal $INC_A$, except that when counter 632 is coupled via multiplexer 626 to the output of adder 620, counter 634 is coupled via multiplexer 628 to the output of adder 622, and counter 636 is coupled via multiplexer 630 to the output of adder 624. Then when counter 632 is coupled via multiplexer 626 to the output of adder 622, counter 634 is coupled via multiplexer 628 to the output of adder 624, and counter 636 is coupled via multiplexer 630 to the output of adder 620. Finally, when counter 632 is coupled via multiplexer 626 to the output of adder 624, counter 634 is coupled via multiplexer 628 to the output of adder 620, and counter 636 is coupled via multiplexer 630 to the output of adder 622. In this way, the three counters 632, 634 and 636 output in turn, during subsequent read phases, a pixel value corresponding to the previous row to be read. Furthermore, the signals $C_{OUTB}$ and $R_B$, and the signals $C_{OUTC}$ and $R_C$, are asserted at the end of the corresponding read cycles. For example, the signals $C_{OUTB}$ and $R_B$ are asserted at the end of the read cycle n−1 in FIG. 7, and at the end of every third read cycle there after, and the signals $COUT_C$ and $R_C$ are asserted at the end of the read cycle n, and at the end of every third read cycle there after.

Figure 8:
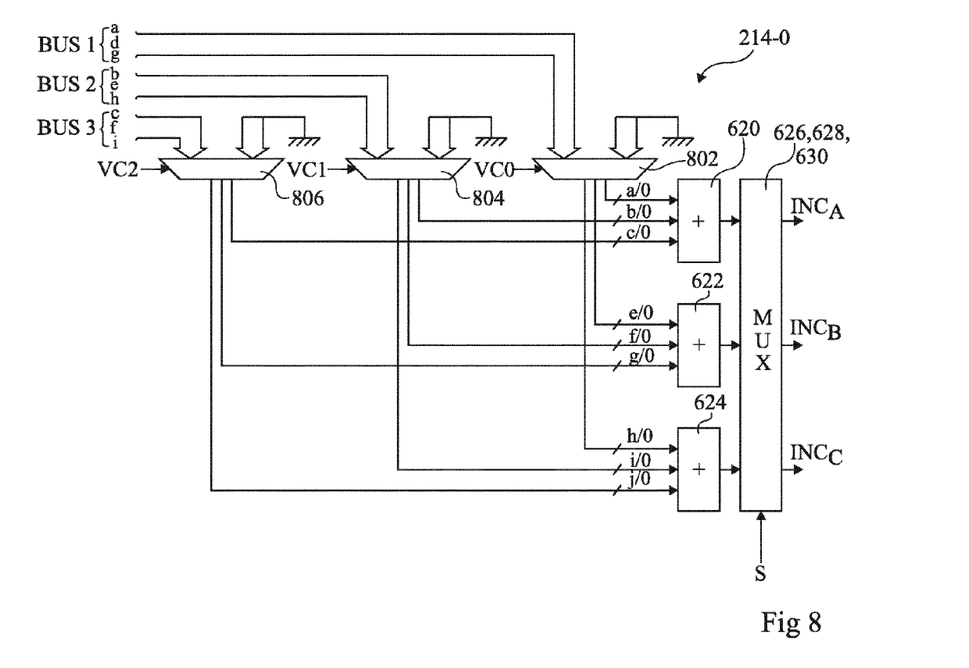
FIG. 8 illustrates counter control circuitry of FIG. 6A in more detail according to an alternative example embodiment.

FIG. 8 illustrates the counter control circuit 214-0 according to an alternative embodiment in which the coefficients are supplied via three buses, rather than being stored in registers. In particular, a bus BUS1 provides the coefficients a, d and g, a bus BUS2 provides the coefficients b, e and h, and a bus BUS3 provides the coefficients c, f and i. Buses BUS1, BUS2 and BUS3 are respectively coupled to a first input of multiplexers 802, 804 and 806 respectively. A second input of multiplexers 802, 804 and 806 is coupled to ground. The multiplexers 802, 804 and 806 are respectively controlled by the signals VC0, VC1 and VC2.

When signal VC0 is high, multiplexer 802 couples the coefficients a, d and g to first inputs of adders 620, 622 and 624 respectively. When signal VC0 is low, these inputs are coupled to ground. Similarly, when signal VC1 is high, multiplexer 804 couples the coefficients b, e and h to second inputs of adders 620, 622 and 624 respectively. When signal VC1 is low, these inputs are coupled to ground. When signal VC2 is high, multiplexer 806 couples the coefficients c, f and i to third inputs of adders 620, 622 and 624 respectively. When signal VC2 is low, these inputs are coupled to ground.

Thus the operation of the counter control circuit 214-0 of FIG. 8 is similar to that of FIG. 6B, except that external control of the coefficients may be provided in real-time, thereby allowing more complex kernels to be applied.

The example circuits of FIGS. 6A and 6B and 8 correspond to an embodiment in which counter control circuits generate increment values rather than variable frequency clock signals VCLK. It will be apparent to those skilled in the art how the circuits of FIGS. 6A and 6B could be adapted to generating a variable frequency clock signal instead. For example, the outputs of multiplexers 626, 628 and 630 could be coupled to the clock inputs of the corresponding counters 632, 634 and 636, via digitally controlled oscillators, which are used to convert the digital values into clock signals of a corresponding frequency. Alternatively, the outputs of multiplexers 626, 628 and 630 could be used to select one of a plurality of clock signals, each clock signal being at a different frequency from the others. The selected clock signal is provided to the clock input of the corresponding counters 632, 634 and 636. As a variant, the signals VC0, VC1 and VC2 could be directly used to make a selection on the fly among the plurality of clock signals, in which case the registers 602 to 618 and adders 620 to 624 could be omitted. In any case, the coefficients a to i and/or the plurality of clock signals at different frequencies define a set of increment rates that are applied during a given read phase for at least some of the possible states of the control signals.

By storing the coefficients in registers or providing the clock signals and/or coefficients on bus, a first set of increment rates can be applied during a first read phase, and a second set of increment rates can be applied during a second read phase, the first and second read phases for example corresponding to separate read phases of pixels of a same image captured by the pixel array, or to read phases of pixels of separate images captured by the pixel array. Each set of increment values for example defines the increment rate for a plurality of the states of the control signals, and the first and second sets are for example different from each other.

In some embodiments, both variable frequencies of the clock signals and variable increments can be used to vary the increment rate during some or all of the read phases. Such a solution for example permits a reduction in the memory requirements for storing the coefficients. For example, a plurality of clock signals at different frequencies could be used to make a coarse selection of the increment rate, and the increment value can be varied to make a fine selection of the increment rate.

In addition to performing a function on a plurality of pixel values as described above, the control signals VC0, VC1, and VC2 can be used to perform other functions, examples of which will now be described with reference to FIGS. 9A, 9B and 9C.

Figure 9A:
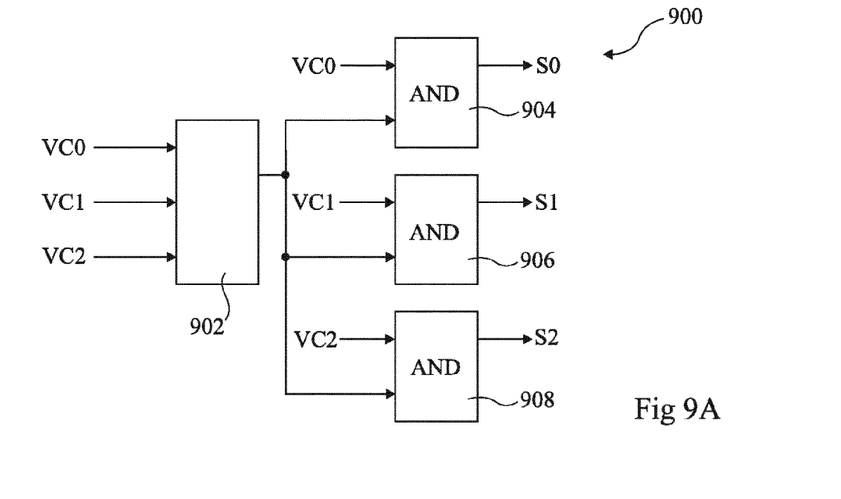
FIG. 9A illustrates circuitry for detecting a minimum and/or maximum pixel value according to an example embodiment.

FIG. 9A illustrates an example of circuitry 900 for determining a minimum or maximum pixel value of the pixel values associated with control signals VC0, VC1 and VC2. The three signals VC0, VC1 and VC2 are coupled to inputs of logic block 902, the output of which is coupled to a first input of each of three AND gates 904, 906 and 908. A second input of each of the gates 904, 906 and 908 receives the signals VC0, VC1 and VC2 respectively.

To detect a maximum pixel value, the logic block 902 detects when only one of the control signals VC0, VC1 and VC2 is high. Thus when one of the signals S0, S1 and S2 from gates 904, 906 and 908 goes high, this indicate which of the three signals VC0, VC1 and VC2 is high and this signal corresponds to the maximum pixel value.

To detect a minimum pixel value, the logic block 902 detects when only one of the control signals VC0, VC1 and VC2 is low. In this case, when two of the signals S0, S1 and S2 from gates 904, 906 and 908 go high but one remains low, the signal that remains low indicates the pixel value with the lowest value.

Figure 9B:
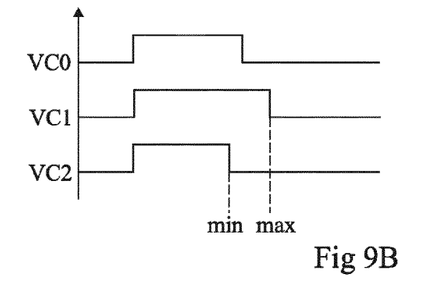
FIGS. 9B and 9C are timing diagrams showing an example of signals in the circuitry of FIG. 9A according to an example embodiment.
Figure 9C:
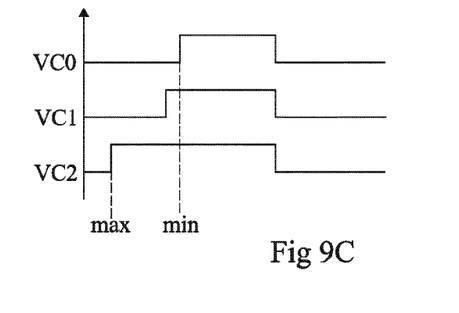

Indeed, as represented by the timing diagrams of FIGS. 9B and 9C, irrespective of whether the control signals VC0, VC1 and VC2 are synchronized at the start or at the end of their respective pulses, the minimum pulse duration corresponds to the pixel for which the control signal is first to fall low or the last to go high, and the maximum pulse duration corresponds to the pixel for which the control signal is the last to fall low or first to go high.

Figure 10:
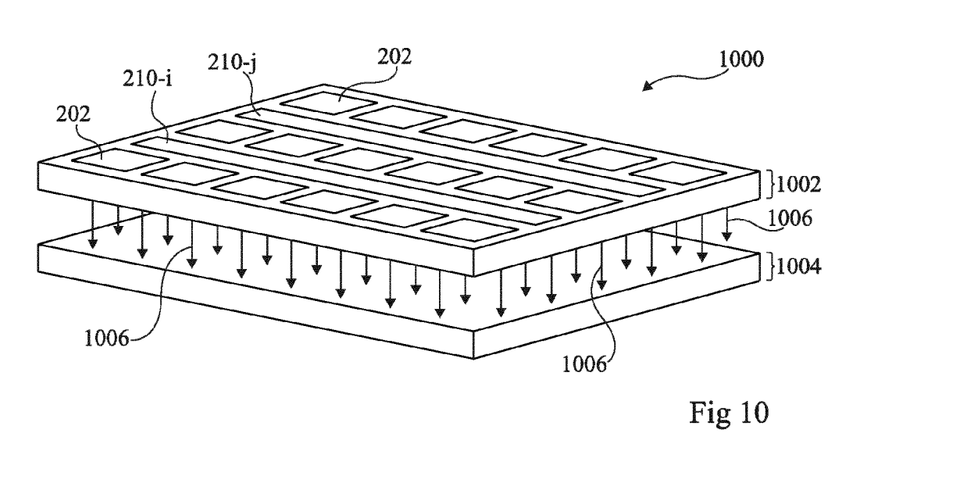
FIG. 10 schematically illustrates in perspective view a three-dimensional processing architecture according to an example embodiment.

FIG. 10 illustrates an example of a three-dimensional imaging device 1000 implementing the pixel processing circuitry as described herein. The device 1000 comprises an integrated circuit 1002 comprising the pixel array of pixel cells 202, and ramp converters 210-i and 210-j, a ramp converter being associated with each column. The device 1000 further comprises a integrated circuit 1004 stacked with respect to the integrated circuit 1002, and comprising the counter control circuits and counters associated with each column. Integrated circuit 1004 also for example contains memory for storing processed pixel data and/or a digital image processor. In the example wherein light falls on the pixel array from above in FIG. 10, the integrated circuit 1004 is for example formed under the integrated circuit 1002, in other words on the opposite side to which light falls on the pixel array.

Between the integrated circuits 1002 and 1004, interconnections 1006 are formed and are used for the transmission of the control signals VCi, VCj, or those of each column, from the integrated circuit 1002 to the integrated circuit 1004. For example, the interconnections could be formed of conducting pillars, or by vias formed in an intermediate substrate (not illustrated in FIG. 10), or any other known interconnection process for superposed integrated circuits.

An advantage of the embodiments described herein is that a function can be applied to pixel values read from a pixel array at the same time as the analog to digital conversion in an energy efficient manner. In particular, by using ramp converters to generate control signals asserted for durations based on the read pixel values, such control signals may be duplicated and transmitted with a minimal energy consumption, because it merely involves charging output lines once at the start of a pulse, and then discharging the lines at the end of a pulse. Furthermore, such signals are advantageously transformed in a simple fashion into control signals for controlling a counter and thus generating a digital value resulting from the applied function.

A further advantage of the embodiments described herein is that each ramp converter and each counter control circuit can be shared by all of the pixel cells of a same column, thereby leading to a relative compact solution.

A further advantage of the embodiments described herein is that, in the case that the counter control block 214-*i* controls the counter 220-*i* with an increment value, the clock frequency of the clock signal CLK used to clock the counter 220-*i* or the counters 632, 634 and 636 of each counter block 602 can be adjusted in order to change the resolution of the resulting digital values. Moreover, by lowering the frequency, the power consumption can be reduced.

While a number of specific embodiments have been described, it will be apparent to those skilled in the art that there are various modifications that could be applied.

For example, while examples of functions involving two, four or nine pixel values have been described, it will be apparent that the principles described herein could be extended to functions involving any number of pixel values.

Furthermore, it will be apparent to those skilled in the art that any of the features described in relation with any of the embodiments could be combined with other described features in any combination. For example, the bus described in relation to FIG. 8 could be used in the embodiment of FIG. 2A for providing the two coefficients a and b, for example as an additional input to the counter control circuit 214-*i*, in which case the register 228 could be omitted.

It will as be apparent that the example of the ramp converter of FIG. 2C is only one example, there being alternative types of ramp converters that could be used to generate the control signals VCi and VCj. For example, a so-call "double-ramp" converter could be used.

It will equally be apparent to those skilled in the art that each time that a signal is described as being high or low, or having a rising or falling edge, the inverse could be implemented. Furthermore, when a signal is described as being asserted, it will be apparent to those skilled in the art that this could correspond to a logic high or a logic low state.

The invention claimed is:

1. A method of processing pixel values in pixel processing circuitry comprising:
   during first and second read phases:
      asserting in the pixel processing circuitry, by a ramp converter, a first control signal for a duration based on a pixel value read via a column line of a pixel array; and
      asserting in the pixel processing circuitry, by another ramp converter, a second control signal for a duration based on another pixel value read via another column line of said pixel array;
   during said first read phase, generating a first digital value as a function of at least said pixel values by controlling, by a first counter control circuit of the pixel processing circuitry based on at least said first and second control signals during said first read phase and on a first set of increment rates, the rate that a first counter is incremented, said first set of increment rates defining an increment rate for each of a plurality of states of the first and second control signals; and
   during said second read phase, generating a second digital value as a function of at least said pixel values by controlling, by said first counter control circuit based on at least said first and second control signals during said second read phase and on a second set of increment rates, the rate that said first counter is incremented, said second set of increment rates defining an increment rate for each of a plurality of states of the first and second control signals, wherein said first set of increment rates is different from said second set of increment rates.

2. The method of claim 1, wherein said first set of increment rates defines a first rate at which said first counter is incremented while said first and second control signals are both asserted and a second rate at which said first counter is incremented while only said first control signal is asserted.

3. The method of claim 2, wherein said first set of increment rates further defines a further rate at which said first counter is incremented while only said second control signal is asserted.

4. The method of claim 3, wherein said first and second sets of increment rates each comprise at least one coefficient, and wherein said first counter control circuit comprises at least one input bus on which is provided the at least one coefficient of said first or second set.

5. The method of claim 3, wherein:
   said first counter is incremented during said first read phase at a first rate while said first and second control signals are both asserted and at a second rate while only one of said first and second control signals is asserted; and
   said first counter is incremented during said second read phase at a third rate while said first and second control signals are both asserted and at a fourth rate while only one of said first and second control signals is asserted.

6. The method of claim 2, wherein said first and second rates vary during said first read phase.

7. The method of claim 6, wherein said first and second sets of increment rates each comprise at least one coefficient, and wherein said first counter control circuit comprises at least one input bus on which is provided the at least one coefficient of said first or second set.

8. The method of claim 2, wherein said first and second sets of increment rates each comprise at least one coefficient, and wherein said first counter control circuit comprises at least one input bus on which is provided the at least one coefficient of said first or second set.

9. The method of claim 1, wherein said first and second sets of increment rates each comprise at least one coefficient, and wherein said first counter control circuit comprises at least one register storing the at least one coefficient of said first or second set.

10. The method of claim 9, wherein said first and second sets of increment rates each comprise at least one coefficient, and wherein said first counter control circuit comprises at least one input bus on which is provided the at least one coefficient of said first or second set.

11. The method of claim 1, wherein said first and second sets of increment rates each comprise at least one coefficient, and wherein said first counter control circuit comprises at least one input bus on which is provided the at least one coefficient of said first or second set.

12. The method of claim 1, wherein said second digital value is further based on said first digital value.

13. The method of claim 1, wherein:
said first counter is incremented during said first read phase at a first rate while said first and second control signals are both asserted and at a second rate while only one of said first and second control signals is asserted; and
said first counter is incremented during said second read phase at a third rate while said first and second control signals are both asserted and at a fourth rate while only one of said first and second control signals is asserted.

14. The method of claim 1, further comprising:
asserting, by a further ramp converter, a third control signal for a duration based on a further pixel value read via a third column line during said first read phase;
wherein said first digital value is further generated as a function of said further pixel value.

15. The method of claim 14, further comprising generating another first digital value by controlling, by a second counter control circuit based on at least said second and third control signals during said first read phase and on a third set of increment rates, the rate that a second counter is incremented, said third set of increment rates defining an increment rate for each of a plurality of states of the second and third control signals.

16. The method of claim 15, further comprising generating a further digital value as a function of at least said pixel values by controlling, based on at least said first and second control signals during said first read phase and on a fourth set of increment rates, the rate that a third counter is incremented said fourth set of increment rates defining an increment rate for each of a plurality of states of the first and second control signals.

17. The method of claim 1, wherein the rate that said first counter is incremented is controlled by performing at least one of:
generating increment values and supplying them to said first counter; and
adjusting the frequency of a clock signal controlling said first counter.

18. The method of claim 1, further comprising determining which of the first and second control signals is asserted for the longest duration by determining at least one of:
whether either of said first and second control signals is the only control signal to be asserted;
whether either of said first and second control signals is the only control signal not to be asserted.

19. Pixel processing circuitry comprising:
a ramp converter coupled to a column line of a pixel array and configured to assert, during a first read phase, a first control signal for a duration based on a pixel value read via said column line during said first read phase and configured to assert, during a second read phase, said first control signal for a duration based on a pixel value read via said column line during said second read phase;
another ramp converter coupled to another column line of said pixel array and configured to assert, during said first read phase, a second control signal for a duration based on another pixel value read via said another column line during said first read phase and configured to assert, during said second read phase said second control signal for a second duration based on another pixel value read via said another column line during said second read phase; and
a first counter control circuit adapted to control a first counter to generate:
a first digital value as a function of at least said pixel values read during said first read phase by controlling, based on at least said first and second control signals during said first read phase and on a first set of increment rates, the rate that said first counter is incremented, said first set of increment rates defining an increment rate for each of a plurality of states of the first and second control signals; and
a second digital value as a function of at least said pixel values read during said second read phase by controlling, based on at least said first and second control signals during said second read phase and on a second set of increment rates, the rate that said first counter is incremented, said second set of increment rates defining an increment rate for each of a plurality of states of the first and second control signals, wherein said first set of increment rates is different from said second set of increment rates.

20. An imaging device comprising the pixel processing circuitry of claim 19, the imaging device having:
a first integrated circuit comprising said pixel array and said first and second ramp converters; and
a second integrated circuit stacked with respect to said first integrated circuit and comprising said first counter control circuit, wherein said first and second control signals are transmitted from said first integrated circuit to said second integrated circuit via one or more interconnections.

* * * * *